United States Patent [19]

de Mets et al.

[11] 4,271,105

[45] Jun. 2, 1981

[54] METHOD FOR THE MANUFACTURE OF PARTICLE BOARD

[75] Inventors: Albert de Mets, Roeselaare, Belgium; Harry Neubauer, Springe, Fed. Rep. of Germany

[73] Assignee: Bison-Werke, Bähre & Greten GmbH & Co. KG, Springe, Fed. Rep. of Germany

[21] Appl. No.: 54,986

[22] Filed: Jul. 5, 1979

[30] Foreign Application Priority Data

Jul. 6, 1979 [DE] Fed. Rep. of Germany ....... 2829817

[51] Int. Cl.³ .............................................. B29H 5/26

[52] U.S. Cl. ....................................... 264/26; 264/113

[58] Field of Search ..................... 156/276, 62.2, 62.6, 156/62.8; 264/23, 25, 26, 113, 125; 425/83.1, 82.1, 174.8 E, 174.8 R, 224, 363, 371, 372, 373, 364

[56] References Cited

U.S. PATENT DOCUMENTS

| | | | |
|---|---|---|---|
| 2,697,254 | 12/1954 | Gordon | 264/113 |
| 3,171,872 | 3/1965 | Jarrett et al. | 264/113 |
| 3,207,819 | 9/1965 | Raddin et al. | 264/26 |
| 3,504,073 | 3/1970 | Rakszawski et al. | 264/113 |
| 3,668,286 | 6/1972 | Brooks et al. | 264/26 |
| 3,796,529 | 3/1974 | Greten | 425/224 |
| 3,873,662 | 3/1975 | Cartlidge et al. | 264/113 |
| 4,005,162 | 1/1977 | Bucking | 264/25 |
| 4,111,744 | 9/1978 | Reiniger | 264/25 |
| 4,113,812 | 9/1978 | Talbott et al. | 425/174.8 E |
| 4,163,638 | 8/1979 | Smith | 425/224 |

*Primary Examiner*—James J. Bell

[57] ABSTRACT

Methods and apparatus are described for the manufacture of particle board in which a fleece of particle material with admixed binder is formed on an endless belt 1 at a forming station and is subsequently passed through a series of presses and heating devices where it is consolidated into particle board.

The lower, and preferably also the upper, covering layers of the fleece are selectively warmed at the forming station to activate the cold binding capability of the admixed binder and endow the fleece with sufficient stability to withstand the handling stresses as it is passed from one endless band conveyor to another.

The selective warming is conveniently achieved by means of respective heating devices each of which incorporates a number of pairs of oppositely poled capacitor plates arranged alternately side by side along the length of the fleece and extending over the full width thereof. In this way longitudinally extending field lines pass between the capacitor plates and penetrate to a required depth in the associated covering layer.

In an alternative embodiment, in which the fleece is conveniently deposited in sequential layers on the endless band fleece carrier, the first layer, which forms the lower covering layer is warmed by passing it between a pair of capacitor plates.

11 Claims, 2 Drawing Figures

METHOD FOR THE MANUFACTURE OF PARTICLE BOARD

Figure 1:
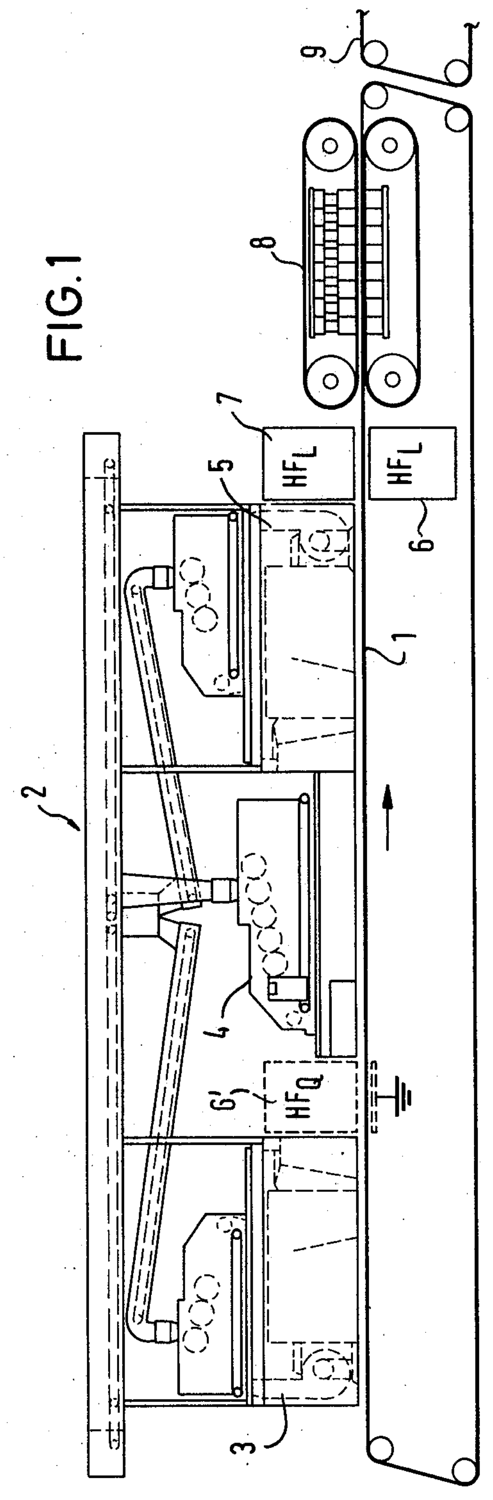

This invention relates to a method and apparatus for the manufacture of particle board or the like and has particular reference to particle board manufactured from particle material comprising a mixture of particles containing cellulose and/or ligno cellulose and at least one binder material.

Several methods are known for manufacturing particle board and are generally based on the steps of firstly forming a fleece of several layers of the particle material with admixed binder on a continuous band and subsequent transmission of the fleece through a number of processing sections which compress the fleece in stages, often with the simultaneous application of heat to improve the workability of the fleece, before finally consolidating it in a finishing press. The particle board can conveniently be made as a continuous strip and subsequently sliced into individual boards or can alternatively be made as a series of sections which are likewise finally cut into boards of the desired size. The particle material is conveniently in the form of small wooden chips or shavings.

It is known that difficulties can occur during the transport of a fleece of chips, in particular during the transport phase from a prepress to a multiple stage (storey) heating press. These difficulties which occur both for the transport of a continuous fleece and also during the transport of chip sections principally occur during the passage from one endless transport band to another which gives rise to the danger of disturbing the cohesion of the particles and thus the danger of non-uniformity of the structure of the fleece. This can result in a significant deterioration of the quality of the end product.

An arrangement is known from DE-AS No. 22 43 028 in which a device for generating an a.c. heating field in a capacitor is arranged between a forming station for forming the fleece and an unheated prepress. The energy supplied to this device is so chosen that the temperature of the fleece at the point at which it enters the prepress is some 10° C. to 30° C. higher than in the vicinity of the forming station. This high frequency warming of the entire fleece activates the cold binding capability of the binding material which is admixed in the fleece. As a result the fleece, or fleece sections, leaving the prepress have sufficient strength to withstand the forces due to acceleration which occur during transport so that the previously mentioned danger of structural deformation is at least extensively removed.

This known arrangement has shown itself to be valuable and has made it possible to endow the fleece, through a relatively small amount of heating, with sufficient strength that difficulties do not occur even when it is necessary to manufacture particle board of smaller thickness after the manufacture of particle board of a required thickness. This had been hitherto problematic as, in order to avoid non-productive idle time of the multi stage heating press, it was necessary to move the smaller thickness fleece sections more quickly from the prepress to the multi stage heating press. Under these circumstances the loads which occur are particularly large.

The principal object of the present invention is to so modify the method described above for use in both single stage and also multi stage installations, that the economy of operation is considerably increased by reduction of the energy requirement for the high frequency warming thus affording the most extensive security against damage during transport of the fleece, in particular during the passage from one endless band to another. A further object of the present invention is to enable a reduction of the quantity of binder material that is required.

According to the present invention there is provided, for satisfying the afore-mentioned objects, a method for manufacturing particle board from particle material comprising particles containing cellulose and in particular ligno cellulose and which are provided with at least one binder material, the method comprising the steps of:

(a) forming a fleece of several layers of said particle material on an endless band in a forming station, said fleece being in the form of one of an endless band fleece and a series of sections of fleece, (b) selectively warming a portion of the fleece by warming at least a first specified layer of the fleece by means of a high frequency a.c. field of a warming capacitor whereby to increase the stability of the fleece during subsequent transport thereof, and (c) forwarding the fleece via further endless bands to a prepress zone and subsequently to a finishing press for final pressing to produce particle board.

Also according to the present invention there is provided apparatus for manufacturing particle board from particle material comprising particles containing cellulose and particularly ligno cellulose and which are provided with at least one binder material, the apparatus comprising a forming station arranged above an endless transport band for scattering several layers of particle material in the form of a fleece onto said endless transport band, capacitive means for selectively warming a portion of the fleece in a high frequency a.c. field by warming at least a first specified layer of the fleece and means for subsequently forwarding the fleece via further endless bands to further equipment comprising at least one of a precompression zone and a prepress zone and subsequently a finishing press for final pressing to produce particle board.

In contrast to the previously known method the present method thus avoids direct warming of the intermediate layer of the fleece and provides a consolidated carrier layer by purposefully warming the lower covering layer of the fleece. The consolidated carrier layer makes it possible to guide the entire fleece, if necessary after having scattered the middle and upper covering layers onto the lower covering layer, without structural displacements, cracks or the like, from one endless transport band to another through to the final finishing press.

If it is born in mind that the ratio of the material between the covering layer and the central layer is around 60 to 40 for the manufacture of relatively thinner to thin boards, and for relatively thicker to thick boards is approximately 20 to 80, and that for achieving the object of the invention it is sufficient to warm solely the lower covering layer of the fleece with high frequency energy to a temperature in the range approximately 30° C. to 60° C., then it can be seen that very considerable savings in investment and heating costs result from the measure suggested in accordance with the invention.

A further significant advantage of the invention resides in the fact that the high frequency warming raises the cold binding force of the binding medium and so influences its viscosity that the utilization of the binder material will be at an optimum. This has the consequence that a reduction of the necessary quantity of binder material is made possible. As the binder material is a decisive cost factor in the manufacture of chip, fibre or similar particle board very considerable significance is attached to this effect.

It is especially advantageous to warm the lower covering layer during the transport of the fleece between the forming station and the precompression and/or prepress zone as in general sufficient space is available in this region for accommodating the apparatus which produces the warming. Thus it is possible to retrofit existing installations with apparatus for carrying out the present invention without difficulties. In accordance with a useful form of the method the upper covering layer is also warmed, in addition to the lower covering layer, by high frequency energy. Preferably the warming of the upper covering layer takes place at least substantially simultaneously with the warming of the lower covering layer.

By the intentional limitation of the relatively low high frequency warming to be lower and upper covering layers of the fleece it is possible to ensure high and uniform technological properties of the manufactured boards and, indeed, with a simultaneous reduction of the necessary quantity of binder material and a reduction of the required high frequency power. Thus a decisive raising of the economy of operation of the manufacturing method is achieved.

An especially advantageous embodiment of an apparatus for carrying out the method of the invention is characterized by a high frequency heating device for warming the lower covering layer of the fleece which is provided between the scattering apparatus in the forming station and the prepress station beneath the transport band and which includes at least a pair of oppositely poled capacitor plates which extend across the width of the fleece and are arranged adjacent to the transport band for generating a longitudinally extending field which penetrates the lower covering layer.

In addition to this high frequency heating device which is arranged beneath the transport band a further similarly constructed high frequency heating device can be provided at least substantially opposite to the first high frequency heating device for warming the upper covering layer of the fleece.

In accordance with a special feature of the invention the capacitor plates of the high frequency heating device for warming the upper covering layer are vertically adjustable and indeed in conjunction with the likewise vertically adjustable lower run of a recirculating endless band which passes between the capacitor plates and the fleece and contacts the fleece.

Usefully the possibility is also provided of adjusting the relative spacing, or position of the capacitor plates which serve to generate the longitudinally extending field in order to be able to use the optimum field strength in every case.

The above-mentioned adjustment of the capacitor plates can usefully take place either by increasing their physical separation in the direction of movement of the fleece or alternatively by rotating them so that they subtend an obtuse angle relative to one another.

Figure 2:
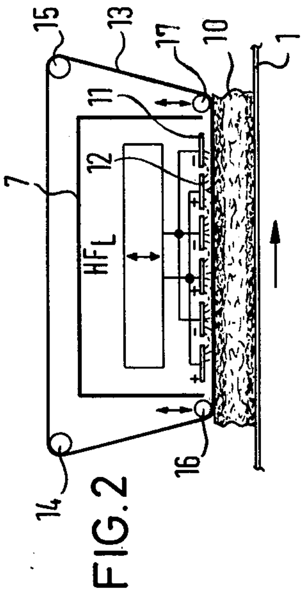

The invention will now be described in further detail by way of example only and with reference to the embodiments shown in the accompanying drawings in which:

FIG. 1 is a schematic illustration of a forming station and a subsequent prepress for carrying out the method of the invention and FIG. 2 is a likewise schematic partial view of a high frequency heating device for warming the upper covering layer of the fleece.

The apparatus schematically illustrated in FIG. 1 shows an endless band 1 which circulates through a forming station 2 and a prepress station 8. The endless band which is used to transport the fleece formed in the forming station moves around a series of guide rollers and drive rollers which impart movement to the endless band in the direction of the arrow. At the outlet from the prepress station 8 the fleece is passed to a further endless band 9 which likewise circulates around rollers and which leads to further equipment for carrying out further operations on the fleece in order to produce particle board. This further equipment is not material to the present invention and so will not be described in further detail. The further equipment will generally include further prepress stages for consolidating the fleece, high frequency heating devices for heating the compressed fleece, a further press for reducing the height of the fleece to approximately that of the finished board and a final finishing press in which the application of heat and pressure to the board material is controlled to finally cure the binder material and to ensure correct consolidation to particle board. One specific form of such apparatus is shown in DE-OS No. 27 22 346.9 (U.S. Ser. No. 905 532). Other systems are also well known and established in the art and some are detailed in the book "Taschenbuch der Spanplattentechnik" Deppe/Ernst published in 1977 by DRW-Verlag Stuttgart, Germany. Whatever form of further equipment is provided it is to be expected that there will be transitions between successive endless transport bands or regions in which the nature of the mechanical forces acting on the fleece can give rise to deformations of the fleece structure.

The forming station 2 arranged above the endless band 1 serves to distribute a mixture of particle material onto the endless band 1. The particle material which typically comprises wooden chips, i.e. particles containing ligno cellulose admixed with binder material is supplied to the forming station 2 from apparatus not shown but likewise well known in the art. Examples of such apparatus are described in the above-mentioned book by Deppe/Ernst. In principle any desired form of forming station can be used; however, as illustrated in FIG. 1, a three head forming station is preferred. The three head forming station of FIG. 1 has a wind sifting scattering chamber 3 for forming the lower covering layer, a scattering chamber 4 for forming the central layer and a further wind sifting scattering chamber 5 for forming the upper covering layer of the fleece. The individual wind sifting scattering chambers are themselves well established in the art and are also described in the book by Deppe/Ernst.

The lower covering layer of the fleece leaving the forming station 2 (which can be seen by referring to FIG. 2 of the drawings) is warmed in the region between the forming station 2 and the prepress station 8 by means of a high frequency heating device 6 which is arranged beneath and adjacent the endless transport band 1.

The lower covering layer is warmed to a temperature in the range approximately from 30° C. to 60° C. by means of the high frequency heating device 6 and it is significant that only a relatively small amount of high frequency energy is required because of the restriction of the warming to this lower covering layer which is of relatively small thickness. Accordingly the high frequency heating device can itself be extremely economically constructed. In practice the high frequency heating device is conveniently arranged in the region between the forming station and the prepress. As a general rule this region is in any case unoccupied by other equipment and thus it is possible to retrofit existing installations with high frequency heating devices of this kind. A further high frequency device 7 is preferably arranged above the high frequency heating device 6 and has the task of warming the upper covering layer of the fleece. The high frequency heating device 7 is illustrated, to an enlarged scale, in FIG. 2 and the high frequency heating device 6 is largely of identical construction. Both the high frequency heating devices 6 and 7 utilise capacitive means for heating the fleece by means of a high frequency a.c. field. The capacitive means are so arranged that the high frequency field that is generated penetrates only the lower and upper covering layers and the central layer remains unaffected, i.e. is unheated.

As previously mentioned it is of a considerable significance that the present invention seeks to achieve the desired consolidation of the fleece using a minimum of high frequency energy.

For this purpose it must be ensured, both in the high frequency heating device 6 and also in the high frequency heating device 7, that essentially only a warming of the respective covering layers takes place and that no energy is consumed for warming the central layer. For this purpose a customary high frequency energy generator is connected to the capacitive means defined by a number of pairs of oppositely poled capacitor plates 11 and 12. The capacitor plates 11 and 12, which are alternately arranged parallel to one another in the direction of movement of the web, are of generally rectangular section and extend across the full width of the fleece. The capacitor plates 11 and 12 are so arranged adjacent the respective covering layer of the fleece 10 that the longitudinally extending electric field formed between neighbouring capacitor plates 11 and 12 only has a depth of penetration into the fleece which corresponds to the thickness of the respective covering layer. The longitudinally extending electric field lines between neighbouring plates thus enter the respective covering layer from one side and emerge from the same side of the covering layer.

A further possible form of the invention which can be particularly used when the warming of specified layers as covered by the present teaching is to be incorporated in a new installation is also illustrated in FIG. 1. In this modification a further high frequency heating device 6' shown in dotted lines is provided between the wind sifting scattering chamber 3 for forming the lower covering layer and the scattering chamber 4 for forming the central layer. This high frequency heating device 6' is used in place of the high frequency heating device 6 arranged beneath the fleece carrying endless band downstream of the forming station 2. The high frequency heating device 6' which is of a kind known per se in the art likewise includes capacitive means for applying a high frequency electric field to the fleece. The specific arrangement however comprises at least one pair of capacitor plates arranged respectively below and above the fleece carrying endless band which cooperate to generate a transverse field through which the lower covering layer passes.

In addition to this high frequency heating device 6' for warming the lower covering layer it is also possible to provide the high frequency heating device 7 at its illustrated location downstream of the forming station, for warming the upper covering layer by means of a longitudinally extending electric field. The fleece which is formed in the forming station 2 and the upper and lower covering layers of which have been warmed with high frequency energy is subsequently passed to a precompression station or a prepress station 8. The passage or transfer onto a further transport band 9 can take place without danger of structural displacement or cracks as the stability of at least the lower covering layer has been increased by prewarming and this satisfies the requirement for providing a sufficient stability for the entire fleece.

Whilst it is possible to operate the high frequency heating device 6' arranged inside of the forming station with a transverse field $HF_Q$, because in the zone of operation of this heating device the fleece only comprises the lower covering layer, it is necessary to operate on the completed fleece with the so-called high frequency longitudinal fields $HL_F$ in order to provide defined penetration depths of the electric field into the covering layers of the fleece.

It is especially advantageous if, as shown in schematic fashion in FIG. 2, the lower run of an endless band 13 runs around the capacitor plates 11 and 12 with the fleece 10 and indeed such that the lower run of the endless band continuously contacts the outermost upper covering layer of the fleece.

As is indicated by the double arrows both the capacitor plates 11 and 12 and also the guide rollers 16 and 17 which guide the run of the endless band adjacent the fleece are vertically adjustable. The further rollers 14 and 15 ensure the necessary tension in the endless band. The further rollers 14 and 15 can also be made vertically adjustable with the lower rollers 16 and 17 so that the tension of the band is maintained constant during vertical adjustment. The vertical adjustment enables the various thicknesses of the prevailing fleece to be taken into account.

The endless band 13 has multiple functions. It plays a roll in evening out irregularities in the formed fleece, in particular irregularities at the surface of the fleece. As a result the capacitor plates 11 and 12 of the high frequency heating device can be continuously brought to a minimum spacing with reference to the prevailing covering layer. This has the consequence that the dielectric losses can be raised and thus that a faster and more efficient heating of the prevailing covering layer of the fleece results. Moreover the lower run of the endless band 13 which bears on the covering layer of the fleece acts as a heat barrier so that the water vapour or condensate which arises as a result of warming of the fleece does not totally escape. By preventing the water vapour from reaching the high frequency heating device the endless band also extensively removes the danger of arcing between the lower side of the lower run of the endless band and the individual capacitor plates. Thus the cooperation between the endless band and the specially constructed high frequency heating device result in efficient safe operation and a significant improvement in the economics of the process.

It will be appreciated that the separation between the individual plates of the capacitor in the longitudinal direction can be made adjustable for controlling the dissipation of electrical energy in the covering layers of the fleece. Likewise a degree of adjustment can be achieved by making each capacitor plate pivotable about a transverse axis which is preferably arranged along one of the transverse edges of the plate so that neighbouring and cooperating pairs of capacitor plates can be arranged at obtuse angles one to another. This principle can be extended by forming each capacitor plate in two halves pivotable about a central axis transversely disposed relative to the fleece so that the adjacent halves of adjacent capacitor plates can be angled towards one another at obtuse angles to effect a fine control on the high frequency electrical power dissipated in the fleece.

It should also be remarked that the high frequency heating device 6 illustrated beneath the endless band carrying the fleece does not of necessity require the provision of a further endless band 13 because of the presence of the endless band 1 carrying the fleece.

It will be apparent to those skilled in the art that further modifications may be made to the subject matter herein disclosed without departing from the scope of the present teaching.

We claim:

1. A method for manufacturing particle board from particulate material comprising at least one binder material admixed with particles containing at least one material selected from cellulose and ligno-cellulose, the method comprising the steps of:

(a) forming a mat of said particulate material by distributing the same onto an endless transport band in a forming station, said mat comprising a bottom layer, an intermediate layer and a top layer, and being in the form of a continuous mat or a series of individual mat sections, (b) selectively warming at least said bottom layer and at most said bottom and top layers by high frequency a.c. field means whereby to increase the stability of the mat during subsequent transport thereof; and (c) transporting said mat on at least one further endless band to a prepress zone, and subsequently to a finishing press for final pressing to produce a board of compressed particles.

2. A method in accordance with claim 1, in which said bottom layer, said intermediate layer, and said top layer are respectively distributed in sequence in said forming station.

3. A method in accordance with claim 1, in which said bottom layer is warmed during transport of said mat on said endless transport band between said forming station and said prepress zone.

4. A method in accordance with claim 1, in which said bottom layer is heated to a temperature in the range of from about 30° C. to 60° C.

5. A method in accordance with claim 2, in which high frequency warming of said bottom layer is carried out directly after distributing said bottom layer in the forming station prior to distributing said intermediate layer.

6. A method in accordance with claim 5, in which, following high frequency warming of said bottom layer and subsequent distribution of said intermediate layer and said top layer, further high frequency warming is applied to the mat substantially at said top layer thereof.

7. A method in accordance with claim 6, in which an electric field for warming said bottom layer permeates the same substantially at right angles thereto and an electric field for warming the top layer enters said top layer from one side and emerges out of the same side thereof.

8. A method in accordance with claim 1, in which said top layer of said mat is warmed by a second high frequency a.c. field simultaneously with the warming of said bottom layer by by said first high frequency a.c. field.

9. A method in accordance with claim 8, in which the respective electric fields for warming both the bottom and the top layers of the mat, have field lines which enter the respectively associated one of said bottom and top layers on one side and emerge from the same side thereof.

10. A method in accordance with claim 1, in which the proportions of binder material selected for said bottom and top layers differ from the proportion selected for said intermediate layer.

11. A method in accordance with claim 1, in which said high frequency a.c. field means comprises a high frequency a.c. field developed between the plates of a capacitor.

* * * * *